US010528993B2

United States Patent
Hoang et al.

(10) Patent No.: US 10,528,993 B2
(45) Date of Patent: Jan. 7, 2020

(54) PAYMENT AND INVOICE SYSTEMS INTEGRATION

(71) Applicant: Intuit Inc., Mountain View, CA (US)

(72) Inventors: Brittney Hoang, Santa Clara, CA (US); Shailesh Shilwant, Milpitas, CA (US); Erica S. Bjornsson, San Francisco, CA (US); Paige E. Costello, Palo Alto, CA (US); Kameshwari Viswanadha, Fremont, CA (US); Ritu Das, Tracy, CA (US); Bradford Hill, Oakland, CA (US); Sachin P. Goregaoker, Santa Clara, CA (US); Jim Schneider, Redwood City, CA (US); Venkata Ram Kumar Paleti, Fremont, CA (US); Lakshmi Narayana Vankayala, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 201 days.

(21) Appl. No.: 15/372,384

(22) Filed: Dec. 7, 2016

(65) Prior Publication Data
US 2018/0158116 A1    Jun. 7, 2018

(51) Int. Cl.
*G06Q 30/04*    (2012.01)
*G06Q 20/10*    (2012.01)
*G06Q 20/00*    (2012.01)

(52) U.S. Cl.
CPC ............. *G06Q 30/04* (2013.01); *G06Q 20/00* (2013.01); *G06Q 20/102* (2013.01)

(58) Field of Classification Search
CPC ......................... G06Q 30/04; G06Q 20/102
See application file for complete search history.

(56) References Cited

U.S. PATENT DOCUMENTS

| | | | | |
|---|---|---|---|---|
| 7,606,750 B1 * | 10/2009 | Hoag | ................... | G06Q 20/108 |
| | | | | 705/30 |
| 9,129,276 B1 * | 9/2015 | Fasoli | .................. | G06Q 10/087 |
| 2002/0065703 A1 * | 5/2002 | Garg | .................. | G06Q 10/0631 |
| | | | | 705/7.12 |

(Continued)

FOREIGN PATENT DOCUMENTS

KR     10-2015-0132591 A     11/2015

OTHER PUBLICATIONS

Icon, "Order Status Icon", Free Icons Library, 2015. (Year: 2015).*

(Continued)

*Primary Examiner* — Abhishek Vyas
*Assistant Examiner* — Abdulmajeed Aziz
(74) *Attorney, Agent, or Firm* — Ferguson Braswell Fraser Kubasta PC

(57) ABSTRACT

A method for systems integration to create an end-to-end view includes obtaining a status of an invoice from an accounting data repository, generating a visualization for the invoice showing the status, and obtaining, from a payment system and based on the status indicating a payment on the invoice, monetary transaction records that match the invoice. The method further includes aggregating the monetary transaction records to update the status of the invoice after the status indicates the payment on the invoice, and updating the visualization with the status of the invoice to show the end-to-end view of the invoice.

18 Claims, 8 Drawing Sheets

(56) References Cited

U.S. PATENT DOCUMENTS

| | | | |
|---|---|---|---|
| 2003/0093373 A1* | 5/2003 | Smirnoff | G06Q 20/102 705/40 |
| 2004/0098307 A1* | 5/2004 | Uehara | G06Q 20/04 705/14.49 |
| 2004/0107164 A1* | 6/2004 | Ghiloni | G06Q 20/10 705/40 |
| 2005/0021426 A1* | 1/2005 | Leroux | G06Q 10/0875 705/29 |
| 2005/0049968 A1* | 3/2005 | Porter | G06Q 20/102 705/40 |
| 2005/0177448 A1* | 8/2005 | Fu | G06Q 30/04 705/26.2 |
| 2006/0085309 A1 | 4/2006 | Tamura | |
| 2006/0218087 A1 | 9/2006 | Zimmerman | |
| 2008/0027877 A1* | 1/2008 | Phelan | G06Q 20/18 705/76 |
| 2008/0097816 A1* | 4/2008 | Freire | G06Q 10/063 705/7.26 |
| 2009/0319421 A1* | 12/2009 | Mathis | G06Q 20/102 705/40 |
| 2010/0082481 A1* | 4/2010 | Lin | G06Q 20/042 705/41 |
| 2012/0185913 A1* | 7/2012 | Martinez | G06F 9/455 726/1 |
| 2012/0330805 A1* | 12/2012 | Eberle | G06Q 30/04 705/34 |
| 2013/0124376 A1* | 5/2013 | Lefebvre | G06Q 20/102 705/34 |
| 2014/0006236 A1* | 1/2014 | Nitschke | G06Q 30/04 705/34 |
| 2014/0258104 A1* | 9/2014 | Harnisch | G06Q 20/102 705/40 |
| 2014/0279310 A1* | 9/2014 | Fossella | G06Q 40/12 705/30 |
| 2015/0127523 A1* | 5/2015 | Schaper | G06Q 40/025 705/38 |
| 2015/0186855 A1* | 7/2015 | Bennett | G06Q 20/102 705/40 |
| 2015/0221045 A1* | 8/2015 | Heckler | G06Q 40/12 705/30 |
| 2016/0140557 A1* | 5/2016 | Hansel | G06Q 30/0637 705/26.82 |
| 2016/0266752 A1* | 9/2016 | Wu | G06F 16/904 |
| 2017/0109748 A1* | 4/2017 | Kote | G06Q 40/12 |
| 2017/0192648 A1* | 7/2017 | Abedin | G06Q 10/06393 |

OTHER PUBLICATIONS

International Search Report issued in corresponding application No. PCT/US2017/065142 dated Mar. 28, 2018 (3 pages).

Written Opinion of the International Searching Authority issued in corresponding application No. PCT/US2017/065142 dated Mar. 28, 2018 (8 pages).

Paypal Help Center; "How Do I Know if my Money Request or Invoice has been Paid?", PayPal, Inc., https://www.paypal.com/us/selfhelp/article/how-is-a-refund-credited-faq1083; Dec. 6, 2016, obtained from: https://web.archive.org/web/20161206025904/https://www.paypal.com/us/selfhelp/article/How-do-I-know-if-my-money-request-or-invoice-has-been-paid-FAQ763 (3 pages).

* cited by examiner

FIG. 6

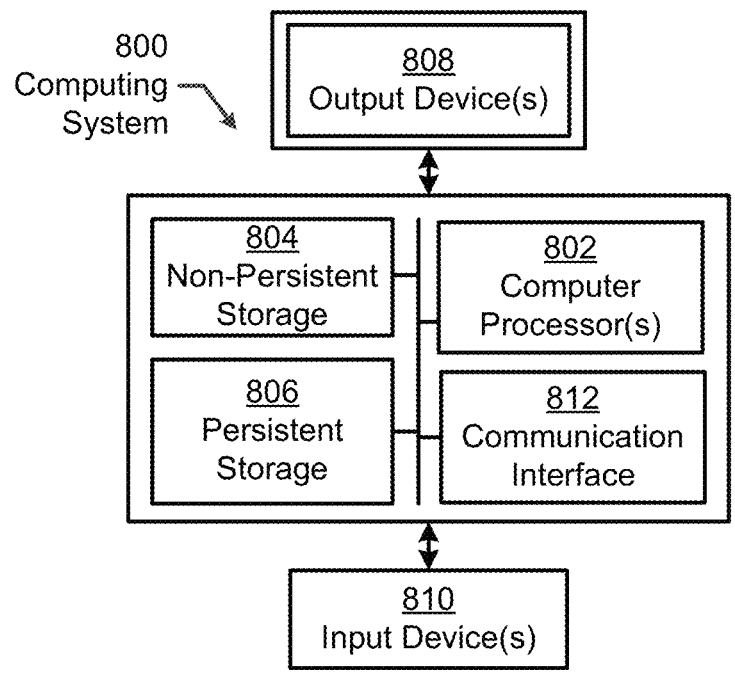
FIG. 8.1
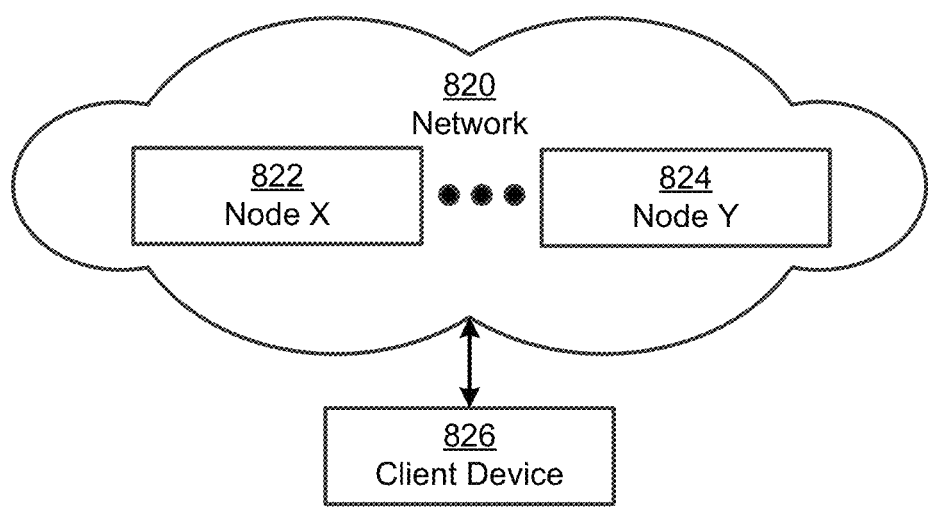
FIG. 8.2

PAYMENT AND INVOICE SYSTEMS INTEGRATION

BACKGROUND

Several different types of financial and commerce systems exist. For example, commerce platforms allow individuals and companies to purchase products from a business entity. For example, payment systems provide a medium through which a payment on the product may be made, while accounting systems store lists of monetary transactions. Generally, the various different systems are separately managed and have heterogeneous storage structures. In other words, even systems that are managed by the same business entity are generally isolated from each other caused by the specialization of the system to process a single type of transaction. In other words, the specialization of functionality isolates the disparate systems such that an end to end visualization is difficult, if not completely impossible. As a result, an individual operating on behalf of the business entity and viewing a user interface of a system may not be able to identify a current status of a payment associated with the purchase of a product.

SUMMARY

In general, in one aspect, one or more embodiments relate to a method for systems integration to create an end-to-end view that includes obtaining a status of an invoice from an accounting data repository, generating a visualization for the invoice showing the status, and obtaining, from a payment system and based on the status indicating a payment on the invoice, monetary transaction records that match the invoice. The method further includes aggregating the monetary transaction records to update the status of the invoice after the status indicates the payment on the invoice, and updating the visualization with the status of the invoice to show the end-to-end view of the invoice.

In general, in one aspect, one or more embodiments relate to a commerce platform for systems integration to create an end-to-end view. The commerce platform includes a computer processor, and an invoice accounting system configured to execute on the computer processor. The invoice accounting system includes an accounting data repository for storing invoices, and an invoice manager executing on the computer processor. The invoice manager is configured to obtain a status of an invoice from an accounting data repository, generate a visualization for the invoice showing the status, obtain, from a payment system and based on the status indicating a payment on the invoice, monetary transaction records that match the invoice. The invoice accounting system is further configured to aggregate the monetary transaction records to update the status of the invoice after the status indicates the payment on the invoice, and update the visualization with the status of the invoice to show the end-to-end view of the invoice.

In general, in one aspect, one or more embodiments relate to a non-transitory computer readable medium for systems integration to create an end-to-end view including computer readable program code. The computer readable program code is for obtaining a status of an invoice from an accounting data repository, generating a visualization for the invoice showing the status, and obtaining, from a payment system and based on the status indicating a payment on the invoice, monetary transaction records that match the invoice. The computer readable program code is further for aggregating the monetary transaction records to update the status of the invoice after the status indicates the payment on the invoice, and updating the visualization with the status of the invoice to show the end-to-end view of the invoice.

Other aspects of the invention will be apparent from the following description and the appended claims.

BRIEF DESCRIPTION OF DRAWINGS

FIG. 6 shows an example in accordance with one or more embodiments of the invention.

FIGS. 8.1 and 8.2 show a computing system in accordance with one or more embodiments of the invention.

DETAILED DESCRIPTION

Figure 1:
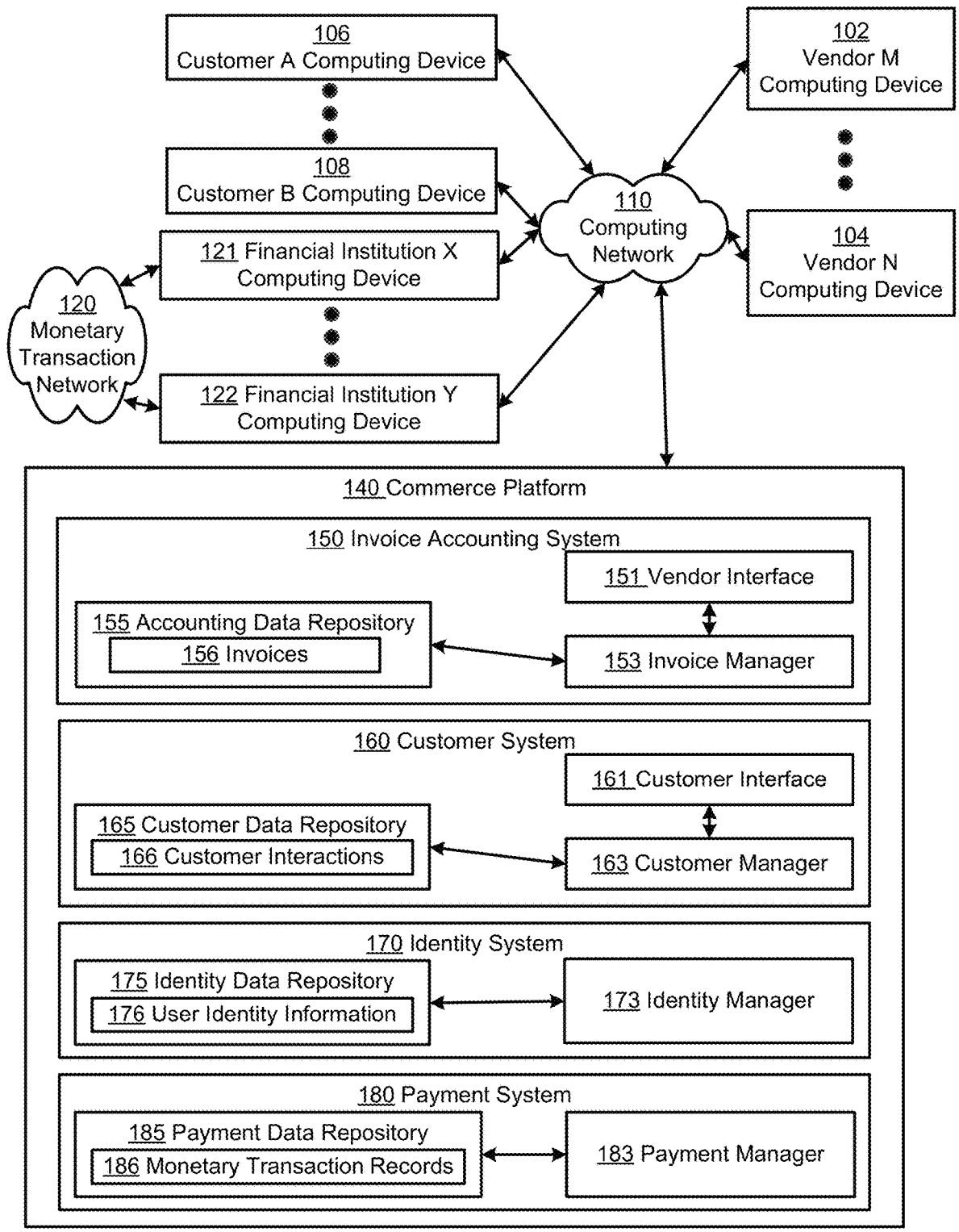
FIG. 1 shows a schematic of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A user as used herein refers to any human individual or entity that performs an action using a computing device. A user is deemed to perform an action when an action is performed on behalf of a user.

In general, embodiments of the invention provide a system and method for integrating an invoice tracking system with a payment tracking system. In particular, one or more embodiments track financial transfer operations associated with a product transaction at any time during the lifetime of the transaction. As described below, the financial transfer operations are used to characterize the status of the product transaction invoice (i.e., invoice). Some financial transfer operations involve post payment operations, such as charge backs, and other such revisions to the payment that changes the payment status of the invoice. Accordingly, the disparate systems are monitored to update the payment status. Through the monitoring and the connection of the disparate systems, the status of the product transaction invoice creates a unified view of the monetary transactions even when such monetary transactions occur through different system and are only recorded as individual records unassociated with the invoices to which the records relate.

By visualizing the payment status associated with multiple product transactions, a vendor is able to see where each transaction is in the process transferring the funds between the vendor's account at vendor financial institution and a customer account on customer's financial institution. In other words, the user may view the end-to-end status of payments in one unified display. Thus, even after the customer makes a payment on an invoice, the payment status may be continually updated as new information regarding the payment is received. By providing the unified view and continually updating the payment status, the user has a more holistic view of the vendor's expected income at any given moment in time without requiring the user to log into a variety of systems and parsing through the data in the heterogeneous data structures. With the complete end-to-end view, the user may be able to make better business decisions based on the user's actual and expected income.

FIG. 1 shows a schematic diagram of a system in accordance with one or more embodiments of the invention. As shown in FIG. 1, the system includes vendor computing devices (e.g., vendor M computing device (102), vendor N computing device (104)), customer computing devices (e.g., customer A computing device (106), customer B computing device (108)), financial institution computing devices (e.g., financial institution X computing device (121), financial institution Y computing device (122)), and commerce platform computing device (140). Each of these components is described below.

The vendor computing devices, customer computing devices, and financial institution computing devices may be connected via a computing network (110). The computing network (110) is any interconnection of computing devices. For example, the computing network (110) may be a local area network, a wide area network, mobile network, any other network, or a combination thereof. The financial institution computing devices may be connected via a monetary transaction network (120). The monetary transaction network (120) is an interconnection of financial institutions that perform the transfer of money between institutions. In other words, the monetary transaction network (120) may include various complementary financial accounts at the financial institutions and a secured network to transmit instructions for debiting and crediting the financial accounts. For example, the monetary transaction network (120) may be Automated Clearing House (ACH) network. Further, the various computing devices may be a computing device shown and described with respect to FIG. 8.1.

The various computing devices (e.g., vendor computing device (e.g., vendor M computing device (102), vendor N computing device (104)), customer computing device (e.g., customer A computing device (106), customer B computing device (108)), financial institution computing device (e.g., financial institution X computing device (121), financial institution Y computing device (122)) may include functionality to connect to the commerce platform (140) via the computing network (110). Specifically, the computing device may execute the financial application or may be remotely connected to a financial application on the commerce platform (140), which may be a web application in such embodiments. A financial application is an application that is configured to manage financial transactions. A financial transaction is an exchange of a product for money. The financial transaction may span a period of time, may involve multiple payments, and/or may involve multiple distributions of the product. Further, the financial transaction may involve more than one product. A financial transaction involves at least one product transaction and at least one monetary transaction. A product transaction is a movement of a product from one party to another party as specified by the financial transaction. For example, the product transaction is the performance of the service or the delivery of goods. A monetary transaction is a movement of money from one party to another party for the financial transaction. For example, the monetary transaction is the changing account balances in banks according to the ACH or credit network.

A financial transaction is stored by the financial application as a financial transaction record. The financial transaction record includes a unique identifier of the financial transaction, one or more identifiers of the product or products being exchanged, information about any contractual provisions, agreed price for the product or products, parties to the financial transaction, discounts applied, other information describing the financial transaction, or any combination thereof.

In one or more embodiments of the invention, the various computing devices are configured each to perform various tasks at the request of a remote computing device through an application programming interface. The application programming interface (API) is a set of programming instructions, protocols and standards for interacting with a software application. For example, a financial institution releases its API to a software company so that the software developers of the software company can design products that are capable of accessing the financial institution services.

A vendor computing device (e.g., vendor M computing device (102), vendor N computing device (104)) is a computing device used by a vendor. A vendor is a provider of one or more products. More particularly, a vendor is a business entity that sells products and enters into financial transactions with customers. The vendor may provide various types of products. For example, a dental care vendor may provide teeth cleaning, fillings, crowns, and other types of dental care.

Specifically, the vendor may maintain a physical store at a geographic location, in which customers visit to purchase the products. Additionally, or alternatively, the vendor may sell the products to customers via a network site (e.g., Internet site, website). A vendor is considered a customer when acting in the role of a customer (e.g., purchasing products from another vendor, such as a distributor or a provider of a different product). By way of an example, the vendor is a distributor that is a customer of the manufacturer and a vendor with respect to a retailer that sells to the end-customer. An example of a vendor is a company that sells computers to customers via physical store location and website. In the example, the computer company is considered a customer when buying the electronic parts to assemble computers. A vendor may also be any other type of business entity, such as a personal enterprise, a non-profit organization, partnership, or any other type of business entity.

A customer is a user that may perform or has performed a financial transaction with a vendor. Specifically, the customer may be or have purchased a product from a vendor of the product. For example, a customer may be a recipient of one or more products from the vendor or a purchaser of the product for another customer. For each financial transaction, the customer receives a single product or multiple products.

A financial institution is a financial entity that acts as an intermediary between the customer and the vendor for the transaction of money. For example, the financial institution may be a bank, a credit card company, or other financial institution. A financial institution of the customer is a customer's financial institution. A financial institution of the vendor is the vendor's financial institution.

Continuing with FIG. 1, the commerce platform (140) includes an invoice accounting system (150), a customer system (160), an identity system (170), and a payment system (180). The various systems of the commerce platform (140) may be supported by separate virtual or physical servers. For example, the accounting system may operate on one or more virtual machine while the payment system operates on one or more different virtual machines that are on the same or different server(s). The various systems may have different storage structures, and software tools with varying programming languages and APIs that are specific to the functions of the corresponding system. Thus, records in one system may not have a direct match to the records in another system.

The invoice accounting system (150) is a system that includes functionality to perform the accounting functions for the vendor. In particular, the accounting system (150) may accept payment initiations from customers, manage and track invoices, perform payroll functions, manage and pay bills, and generate accounting reports and perform other such actions. The invoice accounting system includes an accounting data repository (156), a vendor interface (151), and an invoice manager (153).

The accounting data repository (155) is any type of storage unit and/or device (e.g., a file system, database, collection of tables, or any other storage mechanism) for storing data. Further, the accounting data repository (155) may include multiple different storage units and/or devices. The multiple different storage units and/or devices may or may not be of the same type or located at the same physical site. The accounting data repository (155) includes functionality to store invoices (156). An invoice (156) is an itemized statement specifying the terms of the financial transaction. In one or more embodiments, the financial transaction may be in progress. In particular, the invoice may itemize the products being sold, identify the customer and the vendor, and include payment terms. Specifically, the invoice specifies the payment details of an exchange of at least one product between the vendor and customer. The payment terms in the invoice may include the time period to pay the bill, the amount to pay, forms of acceptable payment, late fees, etc. For example, consider the scenario in which a vendor is a distributor that wholesales jeans to a retailer for $40/pair. In the example, the distributor may deliver the jeans to the retailer waits for payment by the customer. In the invoice, the distributor lists the number of jeans, any taxes and fees, and the payment terms. The distributor provides the invoice to the retailer, who may perform the payment according to the payment terms.

In one or more embodiments, the invoice is characterized by the invoice status. The invoice status is the status of the financial transaction with respect to the invoice at a specific point in time. Specifically, the invoice status summarizes the overall status of the invoice including any monetary transactions at a specific point in time. A monetary transaction is a movement of money between at least two entities. For example, payments and chargebacks are monetary transactions. Monetary transactions may include debiting one financial account and crediting another financial account. For example, a monetary transaction may be through the monetary network. While one or more monetary transactions may be for one or more financial transactions, the monetary transaction may not reflect or include any identifier of the financial transaction to which the monetary transaction relates.

The invoice status may have multiple invoice statuses. For example, each invoice status may relate to a separate monetary transaction related to the invoice. By way of a more specific example, if, for an invoice, one payment is "Deposited", a second is "Overdue (sent)" and a third payment is "Funds on Hold", the invoice statuses may be "deposited", "overdue", and "funds on hold." In the scenario in which an invoice has multiple statuses, one of the statuses may be selected as a representative invoice status based on one or more stored rules. In the above example, "Funds on Hold" may be selected as the representative invoice status. One or more embodiments, may, upon selection of a GUI widget to expand the representative invoice status, display the multiple invoice statuses along with the respective monetary transactions related to the invoice statuses.

Returning to invoice status, the invoice status may include transaction history, account balance, whether the customer received the invoice, pending monetary transactions, whether the balance is paid in full or in part, and other information. In general, the invoice status is selected from any of a prepayment status category, a payment made status category, and a post-payment status category. Statuses in the prepayment status category includes one or more of sent to customer, customer viewed, overdue (viewed), overdue (not sent), overdue (sent), open (viewed), open (not sent), open (sent). Statuses in the payment made status category include paid. Statuses in the post payment status category include funds on hold, chargeback, ACH dispute, deposit fail, payment declined, refund failed paid in-transit, paid deposited, paid undeposited, partially paid, in-transit, void, refund pending, refund complete, partial refund pending, partial refund complete. The above list may be the collection of invoice statuses that may be displayed. Further, the status category may be displayed instead of or in addition to the status. Some of the above invoice statuses may be combined. For example, the invoice status may be selected from Funds on hold, Disputed (Chargeback & ACH dispute), Deposit failed, Payment failed, Overdue (sent), Overdue (not sent), Overdue (viewed), Paid (Undeposited), Deposited, and Void. The invoice status may be generated by accessing the various systems of the commerce network.

The vendor interface (151) is a user interface and/or API that interfaces with the vendor computing device. For example, the vendor interface (151) may be a graphical user interface of a web application, an interface of the financial application located on the vendor computing device, or another interface. The vendor interface (151) includes functionality to present invoice status to the vendor in accordance with one or more embodiments of the invention. In other words, the vendor interface (151) includes functionality to relate the invoices with the corresponding status of the invoices. The invoice status presented is the current status of the invoice in accordance with one or more embodiments.

The invoice manager (153) is configured to manage the invoices for the vendor. In particular, the invoice manager (153) includes functionality to generate invoices, update the status of the invoices, send invoices to customers, and receive initiations of payments from customers. In one or more embodiments, the invoice manager (153) may communicate only indirectly with the customer through the customer system. The accounting system may include other managers without departing from the scope of the invention.

The customer system (160) is a trading system that is configured to provide the customer tools and information to initiate monetary transactions. In one or more embodiments, the customer system (160) provides an interface between the customer and the accounting and payment systems. The customer system (160) includes a customer data repository (165), a customer interface (161) and a customer manager (163). The customer data repository (165) is any type of storage unit and/or device (e.g., a file system, database, collection of tables, or any other storage mechanism) for storing data. Further, the customer data repository (165) may include multiple different storage units and/or devices. The multiple different storage units and/or devices may or may not be of the same type or located at the same physical site. The customer data repository (165) includes functionality to store customer interactions (166). In particular, customer interactions (166) are a log of the interactions that a customer has with the customer system (160). For example, the customer interactions (166) may include a date and time of the customer performing actions for the invoice through the customer system, and an amount of time that the customer viewed the invoice, whether the customer initiated payment on the invoice, an identifier of the invoice(s) with which the customer interacted and other information.

The customer interface (161) is a user interface and/or API that interfaces with the customer computing device. For example, the customer interface (161) may be a graphical user interface of a web application, an interface of the financial application located on the customer computing device, or another interface. The customer interface (161) includes functionality to present invoices and offer payment options to the customer in accordance with one or more embodiments of the invention. In other words, the customer interacts with the invoices through the customer interface of the customer system.

The customer manager (163) is configured to manage the invoices for the customer. In particular, the customer manager (163) includes logic to obtain invoices from the invoice accounting system, perform background processing to present invoices receive payment and update the invoice accounting system. The customer system may further include functionality to match the monetary transactions with the invoices to which the transactions relate.

The identity system (170) is a system that manages user identities for authentication and authorization purposes. Using the identity system, the accounting system, customer system, and payment system may authentic users (e.g., customers, vendors) and authorize the users to access various information. The identity system (170) includes an identity data repository (175) and an identity manager (173). The identity data repository (175) is any type of storage unit and/or device (e.g., a file system, database, collection of tables, or any other storage mechanism) for storing data. Further, the identity data repository (175) may include multiple different storage units and/or devices. The multiple different storage units and/or devices may or may not be of the same type or located at the same physical site. The identity data repository includes functionality to store user identity information (176).

User identity information (176) is administrative data about a particular user, such as unique identifiers, address information, and security credentials. For example, user identity information may include authentication and authorization information for identification and logging into the commerce platform. User identity information (176) may include a unique identity that distinguishes the user from other users in the product transaction and/or commerce platform. For example, each user identity information (176) may include a unique identifier (user ID) and/or authentication context for the corresponding user. The unique user ID may be linked to unique IDs in the computing network, monetary transaction network, and/or computing devices endpoints to enable interactions among multiple networks. To facilitate verification of the identity, the unique user ID may also be linked to preset identifier such as a Taxpayer Identification Number (TIN) and/or Data Universal Numbering System (DUNS) number. The identity may then be used to manage access to services and/or data in the commerce platform by the user.

The identity manager (173) includes functionality to create, update, and delete user identity information (176). The identity manager (173) may further include functionality to authenticate users on behalf of the various systems of the commerce platform.

The payment system (180) includes functionality to process and manage monetary transactions for the vendor. The payment system (180) includes a payment data repository (185) and a payment manager (183). The payment data repository (185) is any type of storage unit and/or device (e.g., a file system, database, collection of tables, or any other storage mechanism) for storing data. Further, the payment data repository (185) may include multiple different storage units and/or devices. The multiple different storage units and/or devices may or may not be of the same type or located at the same physical site. The payment data repository (185) includes functionality to store monetary transaction records (186).

The monetary transaction records (186) are logs of monetary transactions performed using the vendor's account(s) at the financial institutions. In other words, a monetary transaction record is a record of a monetary transaction performed using a monetary account of the vendor. Thus, the monetary transaction record (186) is a description of a particular monetary transaction as obtained from a financial institution. For monetary transactions performed through the commerce system, such as payment on an invoice, the monetary transaction record may include additional information, such as invoice identifier. The description may include a monetary amount, a date and time, a reference code, a description field describing the entity with which the transaction is performed, and other information. In one or more embodiments, when the monetary transaction record is received from the financial institution, the monetary transaction record may not be associated with a particular invoice. One or more embodiments may add information that relates the monetary transaction record to a particular invoice. For example, a monetary transaction record may include invoice ID, monetary amount, one or more products transacted, description, identifier of one or more parties (e.g., customer, vendor) to the transaction, category, the name of the financial institutions involved in monetary transaction, the date and time when the transaction occurred, or another unique description of the monetary transaction. A monetary transaction record may be a dispute record from the customer's financial institution. The dispute may be that the customer indicated a monetary transaction is fraudulent.

A single monetary transaction may be for multiple invoices. For example, a single monetary transaction may include a payment amount that includes a payment for multiple invoices for multiple financial transactions.

Multiple monetary transactions may be for the same invoice. For example, a customer may perform multiple partial payments on the same invoice via the customer system. Further, by way of an example, the customer may also contact the customer's financial institution to request that one or more payments are reversed asserting that the monetary transaction is fraudulent. By way of another example, the customer's financial institution may respond to the monetary transaction in the monetary transaction network with insufficient funds. Thus, monetary transactions records may originate via the commerce system and externally from financial institutions. The external transaction records may not be associated with the invoice.

The payment manager (183) includes functionality to obtain and store at least one monetary transaction record for each monetary transaction. The payment manager (183) may further include functionality to relate monetary transactions with each other.

The financial application may further include functionality to perform additional functions, such as to manage, maintain, and organize financial data. For example, a financial application may assist in performing a financial transaction, performing accounting tasks, filing tax returns, performing business related financial transactions (e.g., billing, payroll, credit card processing), and/or performing other financially related tasks. The financial application may also provide an interface for obtaining transaction records. Additionally, two or more of the financial applications may be the same application, the same type of application, or heterogeneous applications.

While FIG. 1 shows a configuration of components, other configurations may be used without departing from the scope of the invention. For example, various components may be combined to create a single component. As another example, the functionality performed by a single component may be performed by two or more components.

Figure 2:
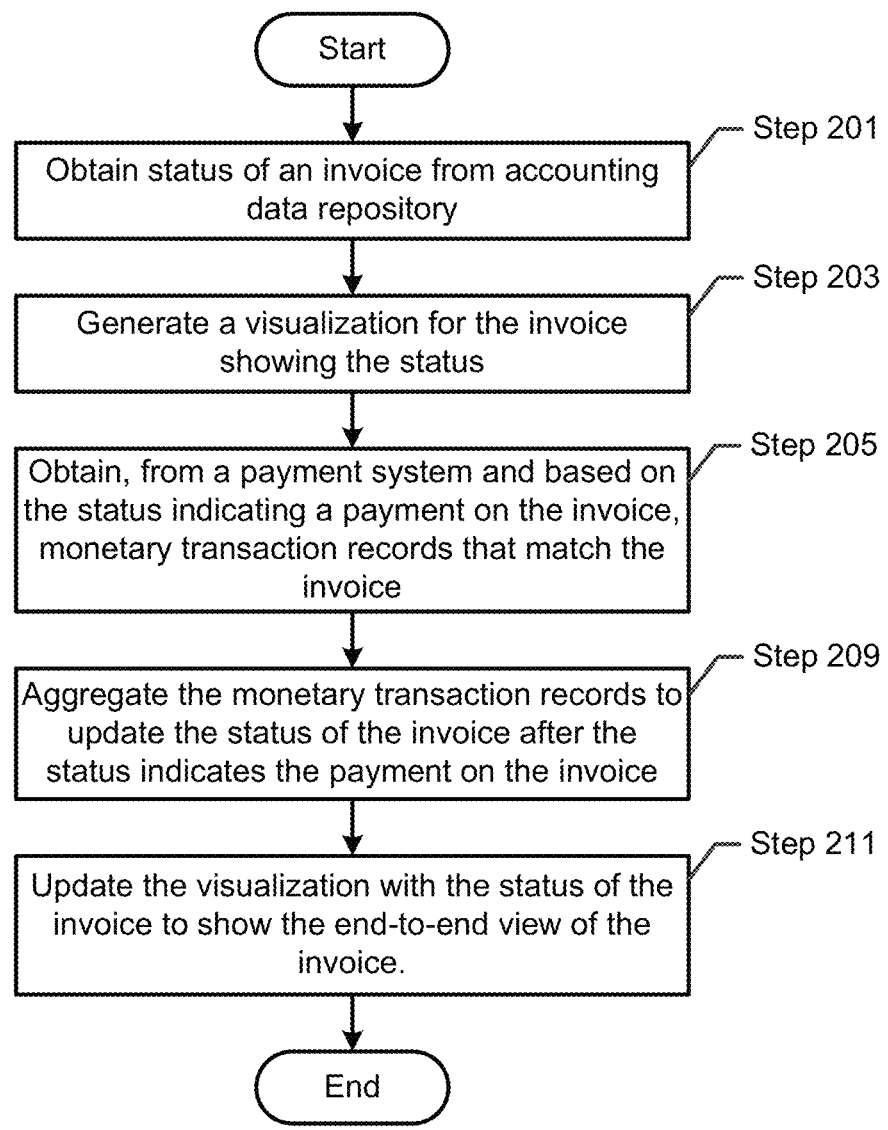
FIGS. 2-5 show flowcharts in accordance with one or more embodiments of the invention.
Figure 3:
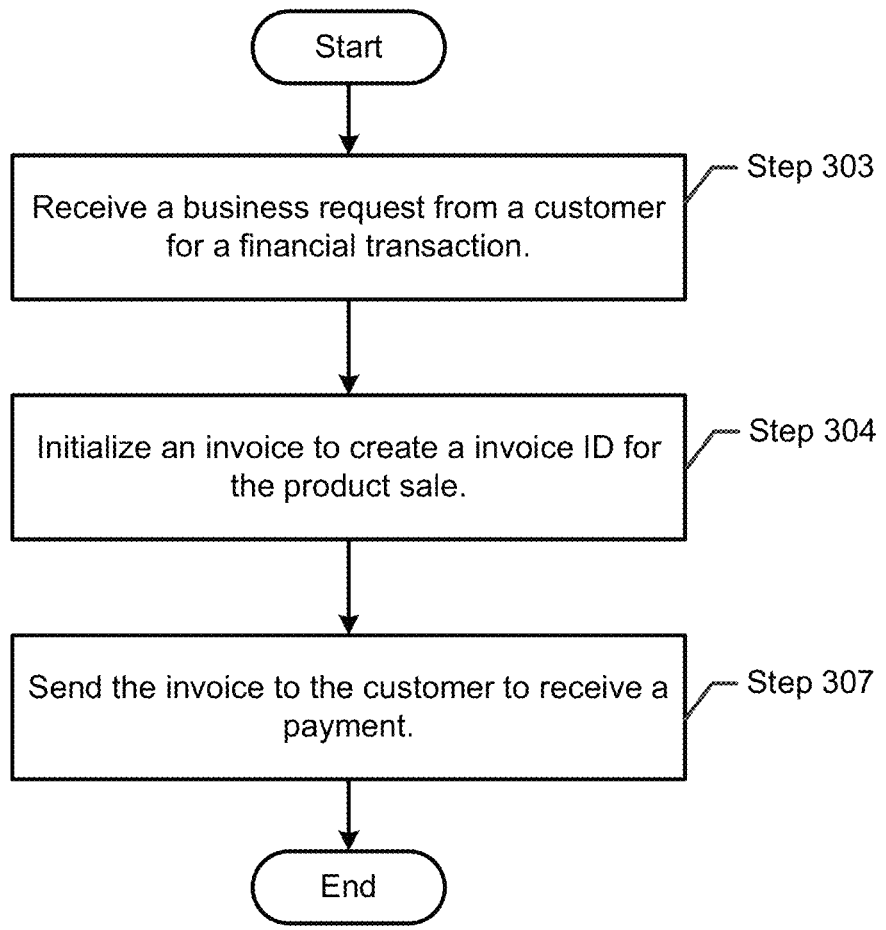
Figure 4:
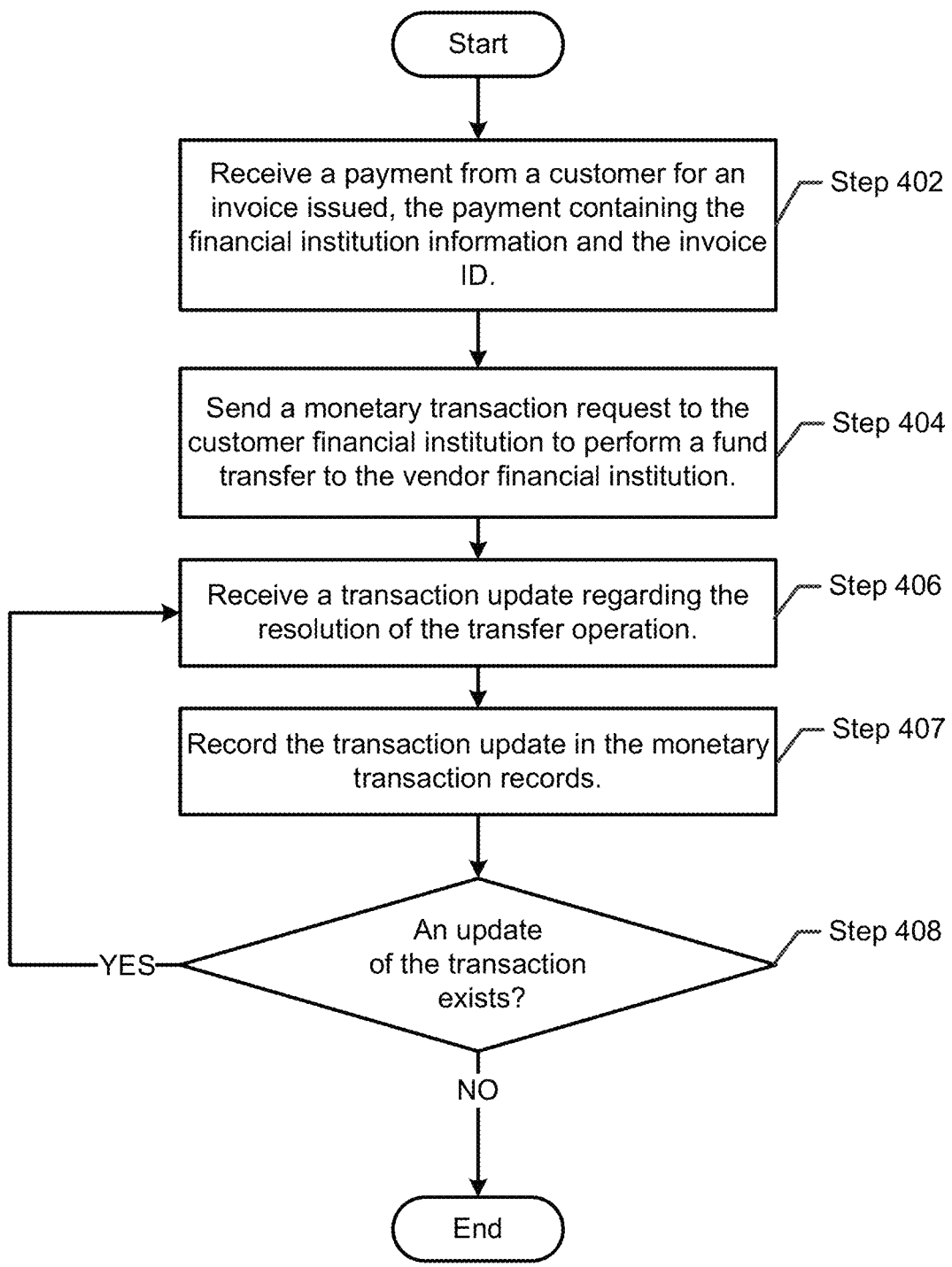
Figure 5:
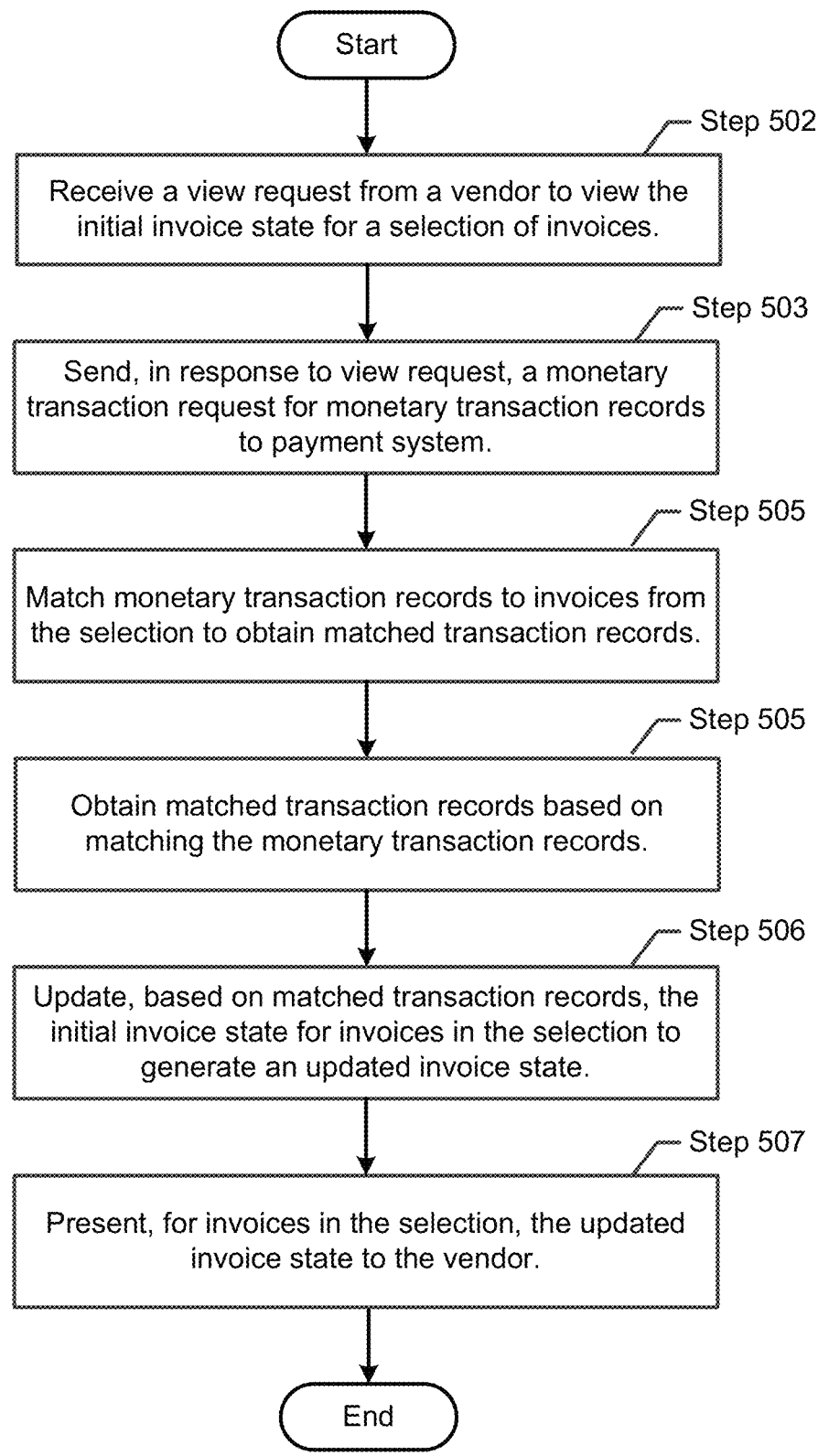

FIGS. 2, 3, 4, and 5 show flowcharts in accordance with one or more embodiments of the invention. FIG. 2 shows a general flowchart in accordance with one or more embodiments of the invention. FIGS. 3-5 show details of end to end creation and management of invoices that results in being able to obtain an end to end view of the invoices. In particular, FIG. 3 shows a flowchart for sending an invoice to a customer. FIG. 4 shows a flowchart for managing monetary transactions for the invoice. FIG. 5 shows a flowchart for presenting a current status of the invoice.

While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 2, FIG. 2 shows a general flowchart for displaying an end to end view in accordance with one or more embodiments of the invention. In Step 201, a status of an invoice is obtained from an accounting data repository. The accounting data repository is queried for the status using an invoice identifier. Based on the invoice identifier, a search is performed to identify the stored record of the invoice and extract the status from the stored record. For example, a user may request display of invoices. In response, the system may respond with the statuses for each of the invoices.

In Step 203, a visualization is generated for the invoice showing the status. For example, a web page may be populated with an identifier of the invoice and the corresponding status of the invoice. The visualization may be presented, such as by being transmitted and/or displayed on a display device of the user's computer system. In some embodiments, at least one invoice has a payment status. The payment status is in the payment made status category or in the post payment status category.

In Step 205, based on the status indicating a payment on the invoice, monetary transaction records that match the invoice are obtained from the payment system. In other words, the accounting system sends a request to the payment system to obtain monetary transaction records of the vendor. The accounting system, the payment system, or a different intermediate system identifies which of the monetary transaction records of the vendor match the invoice. The matching process is discussed below with reference to FIG. 5. For at least one invoice and for at least one vendor, multiple monetary transaction records exist. Each monetary transaction record includes an amount paid or debited.

In Step 207, the monetary transaction records matching the invoice are aggregated to update the status of the invoice after the status indicates payment on the invoice. Because multiple monetary transaction records exist, the amounts of the monetary transaction records are combined to determine the current status. The combination may also be compared with the invoice amount. For example, consider the scenario, in which a customer pays an invoice via ACH, the payment is declined by the customer's financial institution a couple of days later, then the customer makes partial payment a week later. In such a scenario, the invoice status is updated from payment made to payment declined at least the couple of days later, then to partial payment at least the week later. By updating the payment status, the vendor has a better accounting of the vendor's monetary funds. Further, using historical payment statuses for a customer, accounting system and/or vendor may determine whether a customer has a propensity to pay early and have the payment final (i.e., no chargebacks) and whether the customer is likely to have the payment late and have problems in the payment being made final. Accordingly, using the historical information, the vendor and the accounting system is better able to project future earnings according to present invoices.

In Step 211, the visualization is updated with the status of the invoice to show the end-to-end view of the invoice. In particular, the visualization for the at least one invoice for the at least one vendor has a status changed from payment made status to a status in a post payment status category. The updated status is presented to the vendor when presenting the visualization. Rather than both visualizations (original in Step 203 and updated in Step 211) being presented, only the updated visualization is presented in some embodiments.

Further, although not expressly described above, in some embodiments the payment system pushes the status updates and/or the monetary transaction records to the accounting system whenever a monetary transaction record exists in the payment system. The payment system may filter the updates to only updates for monetary transaction records that match a transaction identifier linked to an invoice. The accounting system may link the transaction identifier for the payment to the invoice identifier, and updates referencing the transaction identifier are aggregated according to the transaction identifier.

The flowcharts depicted in FIGS. 3-5 show operations of an end to end system in which one or more embodiments may be implemented. FIG. 5 shows detailed flowchart of FIG. 2.

FIG. 3 shows a flowchart for sending an invoice to a customer. In Step 303, a business request is received from a customer for a financial transaction. A business request for a financial transaction is a customer offer to purchase one or more products from a vendor. By way of an example, the business request may be a sale, a rent, a rent to own or a lease agreement for a product. The business request may be received from a customer visiting a vendor website and committing to purchase a product. By way of another example, the customer may contact the vendor to perform a service.

In Step 304, an invoice is initialized to create an invoice identifier for the financial transaction. In one or more embodiments of the invention, the invoice is initiated by the invoice manager on the invoice accounting system. In particular, with or without vendor interaction, the invoice manager creates a new invoice. Further, the initialization process populates the invoice with the financial transaction details. The initialization process may further create a new unique identifier for the invoice.

In Step 306, the invoice is sent to the customer to receive a payment. If the customer has an identity on the commerce platform that is associated with the invoice, then the invoice is sent to the customer system. For example, the pre-association may be based on past vendor interactions with the customer. The pre-association may further be performed by the customer sending the business request via the commerce platform. If the customer does not have an identity that is associated with the invoice, then the invoice may be sent via an electronic message, email, postal mail or other transmission mechanism. The transmission of the invoice may direct the customer to pay via contacting the vendor or the commerce platform.

FIG. 4 shows a flowchart for updating the transaction records for a financial transaction in accordance with one or more embodiments of the invention. In Step 402, a payment is received from a customer for an invoice issued, the payment including the financial institution information and the invoice identifier. For example, the customer may contact the vendor directly and pay or partially pay the invoice directly to the vendor. If the payment is processed via vendor using the commerce platform (e.g., credit or debit card payments), the vendor may provide via the vendor interface the invoice identifier being paid. The vendor interface may re-direct the vendor to an interface for the payment system to submit monetary transaction details for the payment. Such monetary transaction details may include account information for the customer's financial institution, monetary amount and other information. If the payment is not processed through the commerce platform (e.g., check and cash payments), the vendor may manually enter the payment in the accounting data repository.

By way of another example, the customer may pay the invoice directly via the commerce platform. For example, the customer may be directed to a website to pay the invoice. The customer may provide the invoice identifier (e.g., manually or by selecting a link with the invoice identifier) to the website. The website may be associated with the customer system. The customer system may obtain the invoice matching the invoice identifier from the invoice accounting system. The customer system may further process the invoice using the payment system similar to the manner in which the vendor processes the payment. The customer system may then store logging information and notify the invoice accounting system that the payment was performed.

Although not described above, in the process of creating and/or paying the invoice, the identity of the customer may be obtained in accordance with one or more embodiments of the invention. The customer interface may offer the customer an option either to provide a set of login credentials or to register as a new user for the commerce platform. Following the option, the customer may authenticate to the identity system. The authentication allows the customer to access the customer's account. The customer manager may contact the identity manager and obtain the customer identity information for the customer stored on the identity data repository, such as the identity information for the customer created in the process of new user registration. Thus, the customer identity may be related to the invoice with the invoice identifier.

In Step 404, a monetary transaction request is sent to the customer's financial institution to perform a transfer of money to the vendor's financial institution. The payment system contacts the customer financial institution and instructs the customer's financial institution to transfer funds to the vendor financial institution over the monetary transaction network. The monetary transaction request includes the vendor identity, the customer identity, the monetary amount, and a date. In some embodiments, the monetary transaction request does not include the invoice identifier.

In Step 406, a transaction update is received regarding the resolution of the transfer operation. For example, for the initial payment, the transaction update may be confirmation of the payment. A transaction update may include any new information regarding the activity of the account of the vendor's financial institution versus prior obtained activity. The transaction update may be obtained from the financial institutions by the payment manager. For example, for the payment manager, the transaction update may be obtained using the API of the financial institution for a particular user of the financial institution. By way of a more explicit example, the vendor may provide, to the identity manager, login credentials to access the vendor's account at the vendor's financial institution. The login credentials may be stored in the identity data repository as a vendor or customer identity information. Further, the payment manager may use the login credentials to obtain the transaction update from the financial institution of the vendor and/or customer.

In Step 407, the transaction update is recorded in the transaction records. The payment manager stores any transaction update as a new monetary transaction record in payment data repository. A unique identifier for each monetary transaction record may be generated based on the transaction update. For example, the unique identifier may be a combination of one or more of the following: time, date, vendor identifier, customer identifier, product, invoice ID, and amount of transaction. The transaction update from the financial institution may be different than the transaction update of the vendor in that the vendor may directly enter the vendor's transaction update to the payment data repository, whereas the financial institution creates the financial institution's transaction records that are downloaded to the payment data repository.

In Step 408, a determination is made whether an update of the transaction exists. For example, a financial institution may send a report, which includes updates for each transaction. In such a scenario, the payment manager may update any transaction in the report. By way of another example, the payment manager may send a request to the financial institution to check the existence of a transaction update of a user account. If a transaction update exists, the update is received by the payment manager in Step 406.

Different transaction updates may exist for the same payment. For example, after the payment is made, the customer financial institution may respond to the vendor's financial institution that the customer's financial institution has insufficient funds. By way of another example, the vendor's financial institution may credit the vendor's account and the payment may be shown as complete. By way of another example, the customer or customer's financial institution may issue a chargeback for the payment. By way of another example, the funds (e.g., amount of the payment) may be on hold in the payment system or at the financial institution. By way of another example, a dispute through the ACH network may be issued. The various transaction updates may be stored as separate transaction records at the vendor's financial institution. Further, one or more of the various transaction updates may not be processed through the accounting system or the payment system, but rather processed via the financial transaction network and only provided to the payment system as a separate monetary transaction record. Thus, the payment system may store the updates in the payment data repository. In some embodiments, the payment system may associate the various monetary transactions with each other using the descriptions of the monetary transactions.

FIG. 5 depicts a flowchart for presenting the current status of an invoice in accordance with one or more embodiments of the invention. In one or more embodiments of the invention, a view request from a vendor is received to view the initial invoice status for a selection of invoices in Step 502. In one or more embodiments of the invention, the request is submitted in the vendor interface to the invoice manager.

In Step 503, a monetary transaction request for monetary transaction records is sent to payment system, in response to the view request from the vendor. In one or more embodiments of the invention, the invoice manager sends a monetary transaction request to the payment manager to identify a set of monetary transaction records associated with invoices in the selection. In one or more embodiments of the invention, the invoices may include information that when passed to the payment system enables the payment system to identify transaction records that are associated with each invoice in the invoice selection based on one or more unique identifier. For example, the invoices may include the user identity, an invoice identifier, an amount of the invoice, date and time of the payment, any other information, or combination thereof. In one or more embodiments, the monetary transaction request for monetary transaction is sent only if a monetary transaction against the invoice exists. If no monetary transaction exists, the status may be a non-payment system status (Viewed, Sent, Paid via other method and recorded manually, or other non-payment status). More particularly, the selection may be filtered to remove invoices that do not have a monetary transaction. Other invoices in the selection, each with a monetary transaction, may be sent in the monetary transaction request.

In Step 505, monetary transaction records are matched to invoices from the selection. In Step 505, matched transaction records are obtained based on matching the monetary transaction records. The transaction records from the payment data repository are filtered to identify the transaction records in accordance with one or more embodiments of the invention. In other words, the payment manager, customer system, or invoice accounting system uses information from the transaction records to identify, across the transaction records in the payment data repository, which transaction records correspond to each invoice in the invoice selection.

For example, the invoice identifier may be provided to the customer system when the payment is processed. The customer system initiates the payment with the payment system. In response, the payment system may provide a payment identifier. The payment identifier is relayed back to the invoice accounting system along with the invoice identifier. The invoice accounting system may then store the relationship between the invoice identifier and the payment identifier.

The above are only an example for matching transaction records to invoices. Other mechanisms for matching transactions records may be used without departing from the scope of the invention.

In Step 505, the initial invoice status for invoices in the selection is updated based on matched transaction records to generate an updated invoice status. In one or more embodiments, the matched transaction records are aggregated to determine the updated invoice status. In particular, the aggregation may be performed as follows. In one or more embodiments of the invention, the transaction records for each invoice in the invoice selection are sorted according to the date and time in the transaction record information. In one or more embodiments of the invention, the amounts of each transaction in the sequence of the transactions are summarized and the total is compared with the amount in the corresponding invoice. In one or more embodiments of the invention, the updated invoice status is determined according to a set of rules that are applied to the transaction records.

In Step 506, the updated invoice status for invoices in the selection is presented to the vendor. For each invoice, the updated invoice status is presented. Because the invoice status also includes post payment processing, the invoice status allows the vendor to see which invoices may have been initially paid, but now have a chargeback. The invoice status may be shown as a graph, with text, or using another technique. In one or more embodiments, the invoice status is presented as a single summary of the status of the invoice, such as using a phrase, or a graphical indicator of the status. As shown, one or more embodiments combine the information from the various disparate systems involving different networks to provide a post payment view of the invoice.

Figure 6:
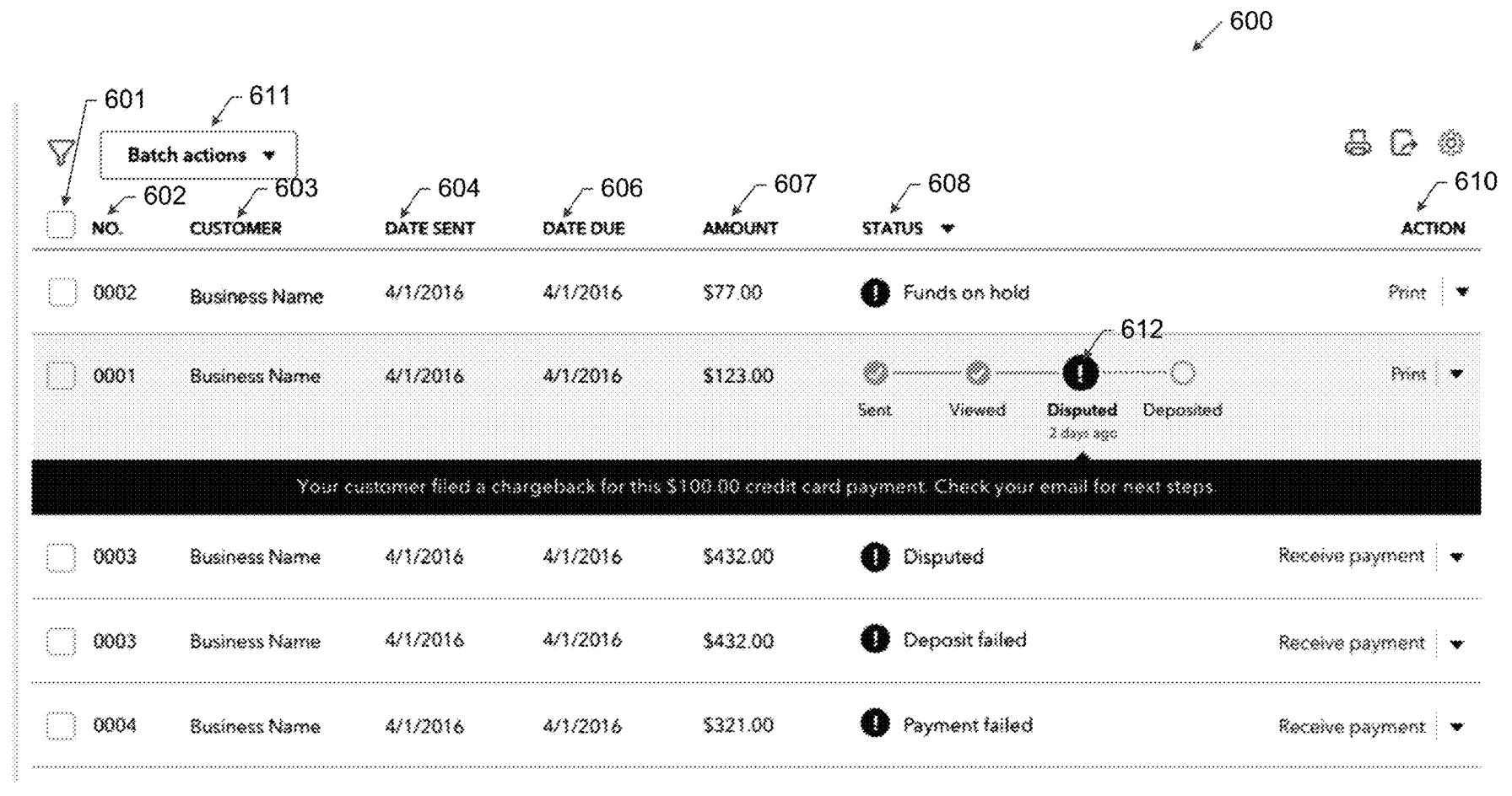

FIG. 6 shows an example of a vendor interface (600) in accordance with one or more embodiments of the invention. As shown in the Examiner, the vendor interface (600) may list multiple invoices. In the example, the invoices are each a row. Each column is a field of the invoice presenting information about the respective invoice. For example, the first column (601) is a checkbox that allows the vendor to select multiple invoices and perform a batch action by selecting widget (611). The second column (602) lists the invoice identifier. The third column lists the client or customer identifier (603). The fourth column (604) lists the date that the invoice was sent. The fifth column (606) lists the date in which the invoice is due. The seventh column (607) lists the amount of the invoice. The eighth column (608) lists the invoice status of the invoice. The ninth column (610) allows the user to select the invoice to view further details. As shown by the invoice status column (608), using the vendor interface, the vendor is able to see both the prepayment and post payment processing of the invoice. In the expanded view (612), the vendor may further see additional payment details including transaction updates.

Figure 7:
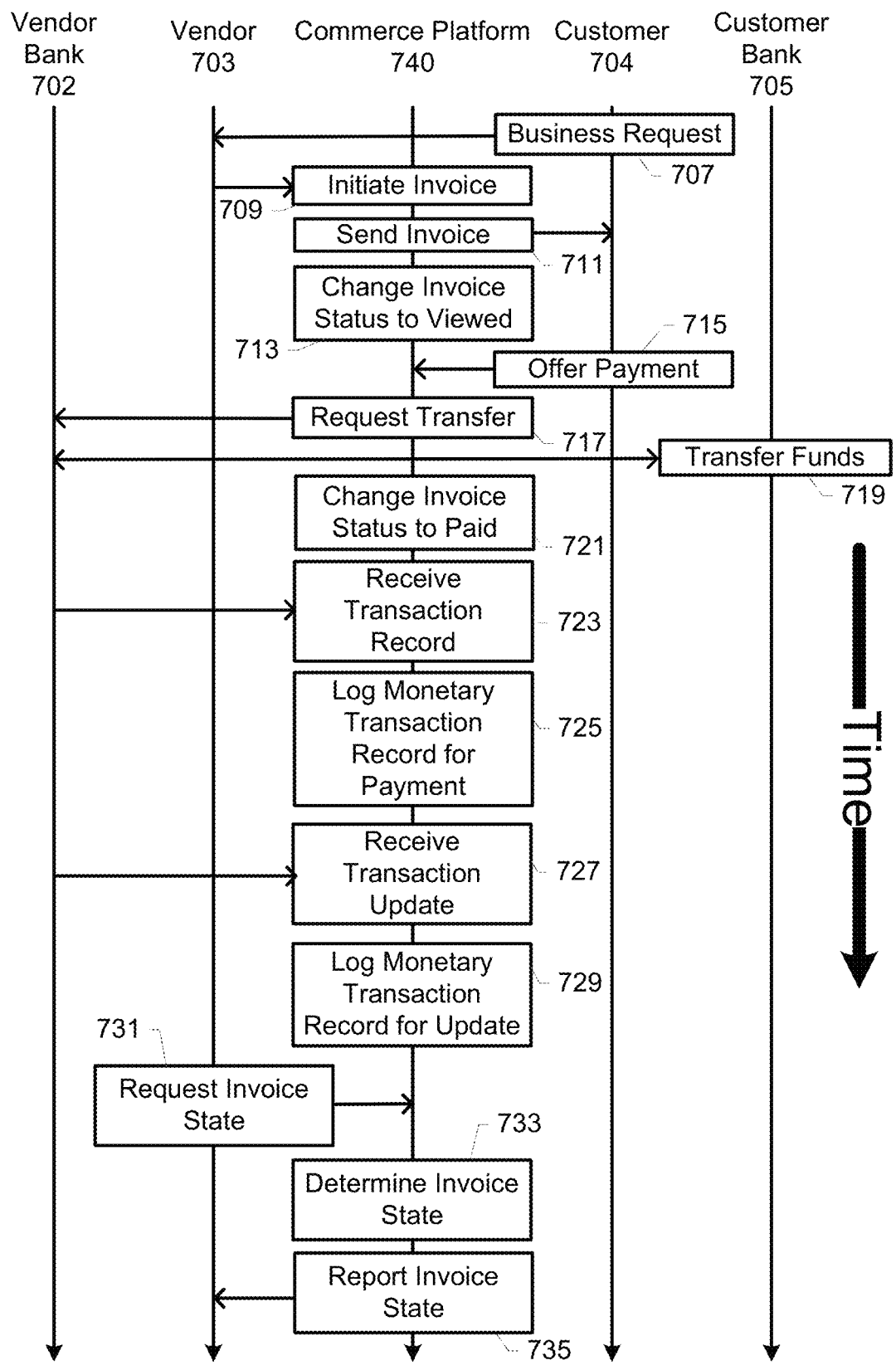
FIG. 7 shows an exemplary timeline of a series of interactions between a customer and a vendor in accordance with one or more embodiments of the invention.

FIG. 7 shows an example of a timeline of a series of interactions between a vendor (703), a customer (704), a vendor bank (702), and a customer bank (705) in accordance with one or more embodiments of the invention. The vendor and the customer may be individuals, organizations, and/or representatives of the organizations that are engaged in product transaction with one another. To facilitate the product transaction, commerce platform (740) may enable the interactions independently of a set of endpoints used by entities (702-705) to access commerce platform (740).

Beginning with time (707), customer (704) may initiate an interaction by sending a business request directly to the vendor (703) on an external channel. The vendor (703) may generate on commerce platform (740) an invoice at time (709) in response to the business request from customer (704). Commerce platform (740) may store the invoice and transmit a notification of the invoice to customer (704) at time (711). To transmit the notification, commerce platform (740) may obtain customer information for customer (704) from the interaction and match customer information to customer (704) in the model. Commerce platform (740) may then direct the customer (704) to access the notification on one endpoint on the commerce platform (740). For example, commerce platform (740) may send the notification as a message to an endpoint that is both used by customer (704) and related to the endpoint used by vendor (703) to send the invoice. Alternatively, if customer (704) is not registered with commerce platform (740), commerce platform (740) may transmit the notification as an email, text message, and/or other communication to the customer information for customer (704). At time (713), the invoice status is changed to viewed from created when the customer (704) uses the notification to retrieve the invoice from commerce platform (740). For example, customer (704) may provide authentication credentials to the endpoint to which the notification is routed to access the notification. Next, customer (704) may use a link in the notification to obtain the invoice from commerce platform (740). After the invoice is obtained by customer (704), the interaction associated with transmitting the invoice may be complete.

At time (715), customer (704) may initiate a second interaction by providing a payment of the invoice to commerce platform (140). Commerce platform (740) may receive the request, retrieve payment credentials from the user customer information, and route the payment request to customer bank (705) at time (717). At time (719), customer bank (705) may use the request to initiate a direct fund transfer to vendor bank (702), over an independent channel. Further, the commerce platform (740) may change the invoice status to paid at time (721). The commerce platform (740) may change the invoice status before, during, or after the actual monetary transaction for the payment is performed. Alternatively, commerce platform (740) may request to vendor bank (702) to transfer funds directly from customer bank (705).

At time (723), the vendor bank (702) may initiate a third interaction by providing the commerce platform (740) a transaction update regarding the fate of the funds transfer operation. At time (725), commerce platform (740) logs the transaction update as a monetary transaction record.

At time (727), the commerce platform (740) receives a transaction update. The transaction update may be due to the customer (704) declaring the transaction fraudulent (e.g., to the customer's bank), the customer bank denying the transaction for lack of funds, or for another reason. Accordingly, at time (729), the commerce platform logs the monetary transaction record based on the transaction update. Thus, the commerce platform has a monetary transaction record with a payment and a separate monetary transaction record with a deduction. Notably, neither monetary transaction record is explicitly associated with the other monetary transaction record in this example. In other words, the monetary transaction records do not have a pointer to the other record, a unique identifier of the other records, or any other explicit identifier of the other record.

At time (731), the commerce platform (740) receives a request from the vendor to obtain the invoice state. For example, the vendor may request a display of a graphical user interface that shows a list of invoices and the corresponding state of each invoice. At time (733), the invoice state is determined. The invoice state is determined by aggregating the monetary transaction record at time (725) and at time (729). Thus, if the chargeback occurred, the invoice state is changed to indicate the charge back. The invoice state is displayed with the invoice at time (735) so that that vendor is able to view the current invoice state for the invoice.

Embodiments of the invention may be implemented on a computing system. Any combination of mobile, desktop, server, router, switch, embedded device, or other types of hardware may be used. For example, as shown in FIG. 8.1, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma displays, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8.1 may be connected to or be a part of a network. For example, as shown in FIG. 8.2, the network (820) may include multiple nodes (e.g., node X (822), node Y (824)). Each node may correspond to a computing system, such as the computing system shown in FIG. 8.1, or a group of nodes combined may correspond to the computing system shown in FIG. 8.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8.1. Further, the client device (826) may include and/or perform all or a portion of one or more embodiments of the invention.

The computing system or group of computing systems described in FIGS. 8.1 and 8.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 8.1 and the nodes and/or client device in FIG. 8.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for systems integration to create an end-to-end view on a vendor graphical user interface comprising:
   obtaining, by an invoice accounting system, a status of a single invoice from an accounting data repository, the status indicating a payment in full on the single invoice;
   generating, by the invoice accounting system, a visualization of the vendor graphical user interface showing the status for the single invoice;
   obtaining, by the invoice accounting system, via an application programming interface (API) of a payment system and based on the status indicating the payment in full on the single invoice, a plurality of monetary transaction records from a payment data repository that match the single invoice, the plurality of monetary transaction records each recording a transfer of an amount of money;
   aggregating, by the invoice accounting system, the amounts of money across the plurality of monetary transaction records to update the status of the single invoice after the status indicates the payment in full on the single invoice, wherein the updated status indicates a chargeback; and
   updating, by the invoice accounting system and upon selection of the single invoice by a user, the visualization of the vendor graphical user interface to show the end-to-end view of the single invoice, wherein the end-to-end view comprises a graphical depiction of a series of interconnected payment categories including a disputed category indicating the chargeback on the single invoice to a vendor, wherein the graphical depiction further comprises a sent category icon connected to a view category icon connected to the disputed category icon connected to a deposited category, wherein the disputed category icon is highlighted,
   wherein updating the visualization comprises:
      displaying the single invoice as a single row of a table comprising a plurality of columns,
      displaying, as one of the plurality of columns, a status column,
      displaying the graphical depiction in the single row and in the status column,
      displaying, in the row, a note describing (i) the chargeback and (ii) instructions for a vendor to follow with respect to responding to the chargeback, and
      displaying an indicator indicating a connection between the note and the disputed category,
   wherein the end-to-end view is an expanded view upon selection of the single invoice on the vendor graphical user interface, the expanded view comprising the graphical depiction and the note.

2. The method of claim 1, further comprising:
receiving, subsequent to generating the visualization, a view request to view the status of the single invoice;
obtaining the status of the single invoice from the accounting data repository; and
determining that the payment in full on the single invoice is performed based on the accounting data repository,
wherein obtaining the plurality of monetary transaction records is in response to the view request and the determining that the payment in full on the single invoice is performed.

3. The method of claim 1, further comprising:
sending, in response to the status indicating the payment in full, a monetary transaction request to the payment system, the monetary transaction request identifying the single invoice.

4. The method of claim 1, further comprising:
matching the plurality of monetary transaction records to the single invoice based on a payment identifier of the payment in full.

5. A commerce platform for systems integration to create an end-to-end view on the vendor graphical user interface comprising:
a computer processor; and
an invoice accounting system configured to execute on the computer processor and comprising:
an accounting data repository for storing a plurality of invoices; and
an invoice manager executing on the computer processor and configured to:
obtain a status of a single invoice in the plurality of invoices from an accounting data repository, the status indicating a payment in full on the single invoice;
generate a visualization of the vendor graphical user interface showing the status for the single invoice;
obtain, via an application programming interface (API) of a payment system and based on the status indicating the payment in full on the single invoice, a plurality of monetary transaction records from a payment data repository that match the single invoice, the plurality of monetary transaction records each recording a transfer of an amount of money;
aggregate the amounts of money across the plurality of monetary transaction records to update the status of the single invoice after the status indicates the payment in full on the single invoice, wherein the updated status indicates a chargeback; and
update, upon selection of the single invoice by a user, the visualization of the vendor graphical user interface to show the end-to-end view of the single invoice, wherein the end-to-end view comprises a graphical depiction of a series of interconnected payment categories including a disputed category indicating the chargeback on the single invoice to a vendor, wherein the graphical depiction further comprises a sent category icon connected to a view category icon connected to the disputed category icon connected to a deposited category, wherein the disputed category icon is highlighted, wherein updating the visualization comprises:
displaying the single invoice as a single row of a table comprising a plurality of columns,
displaying, as one of the plurality of columns, a status column,
displaying the graphical depiction in the single row and in the status column,
displaying, in the row, a note describing (i) the chargeback and (ii) instructions for a vendor to follow with respect to responding to the chargeback, and
displaying an indicator indicating a connection between the note and the disputed category,
wherein the end-to-end view is an expanded view upon selection of the single invoice on the vendor graphical user interface, the expanded view comprising the graphical depiction and the note.

6. The commerce platform of claim 5, further comprising:
a customer system comprising:
a customer data repository for storing a plurality of customer interactions with the single invoice, and
a customer manager executing on the computer processor, the customer manager configured for receiving a payment for the single invoice and processing the payment via the payment system, wherein the payment is recorded as a matched transaction record in the plurality of matched transaction records.

7. The commerce platform of claim 5, wherein the payment system further comprises a payment manager, the payment manager configured to match the plurality of monetary transaction records from a financial institution.

8. The commerce platform of claim 5, wherein the invoice manager is further configured to:
receive, subsequent to generating the visualization, a view request to view the status of the single invoice;
obtain the status of the single invoice from the accounting data repository; and
determine that that the payment in full on the single invoice is performed based on the accounting data repository,
wherein obtaining the plurality of monetary transaction records is in response to the view request and the determining that the payment in full on the single invoice is performed.

9. The commerce platform of claim 5, wherein the invoice manager is further configured to:
send, in response to the status indicating the payment in full, a monetary transaction request to the payment system, the monetary transaction request identifying the single invoice.

10. A non-transitory computer readable medium for systems integration to create an end-to-end view on a vendor graphical user interface comprising computer readable program code for:
obtaining, by an invoice accounting system, a status of a single invoice from an accounting data repository, the status indicating a payment in full on the single invoice;
generating, by the invoice accounting system, a visualization of the vendor graphical user interface showing the status for the single invoice;
obtaining, by the invoice accounting system, via an application programming interface (API) of a payment system and based on the status indicating the payment in full on the single invoice, a plurality of monetary transaction records from a payment data repository that match the single invoice, the plurality of monetary transaction records each recording a transfer of an amount of money;
aggregating, by the invoice accounting system, the amounts of money across the plurality of monetary transaction records to update the status of the single invoice after the status indicates the payment in full on the single invoice, wherein the updated status indicates a chargeback; and updating, by the invoice accounting system and upon selection of the single invoice, the visualization of the vendor graphical user interface to show the end-to-end view of the single invoice, wherein the end-to-end view comprises a graphical depiction of a series of interconnected payment categories including a disputed category indicating the chargeback on the single invoice to a vendor, wherein the graphical depiction further comprises a sent category icon connected to a view category icon connected to the disputed category icon connected to a deposited category, wherein the disputed category icon is highlighted, wherein updating the visualization comprises:
displaying the single invoice as a single row of a table comprising a plurality of columns,
displaying, as one of the plurality of columns, a status column,
displaying the graphical depiction in the single row and in the status column,
displaying, in the row, a note describing (i) The chargeback and (ii) instructions for a vendor to follow with respect to responding to the chargeback, and
displaying an indicator indicating a connection between the note and the disputed category,
wherein the end-to-end view is an expanded view upon selection of the single invoice on the vendor graphical user interface, the expanded view comprising the graphical depiction and the note.

11. The non-transitory computer readable medium of claim 10, wherein the computer readable program code is further for:
receiving, subsequent to generating the visualization, a view request to view the status of the single invoice;
obtaining the status of the single invoice from the accounting data repository; and
determining that the payment in full on the single invoice is performed based on the accounting data repository,
wherein obtaining the plurality of monetary transaction records is in response to the view request and the determining that the payment in full on the single invoice is performed.

12. The method of claim 1,
wherein the accounting data repository has a first storage structure,
wherein the payment data repository has a second storage structure, and
wherein the first storage structure and the second storage structure are different.

13. The method of claim 1, further comprising:
receiving, by the invoice accounting system and from a customer system, (i) a payment identifier and (ii) an invoice identifier of the single invoice, wherein the customer system receives the payment identifier and the invoice identifier from the payment system in response to initiating the payment in full on the single invoice; and
storing, by the invoice accounting system, a relationship between the payment identifier and the invoice identifier.

14. The commerce platform of claim 5, wherein the invoice accounting system and the payment system are located on different servers.

15. The commerce platform of claim 5,
wherein the accounting data repository has a first storage structure,
wherein the payment data repository has a second storage structure, and
wherein the first storage structure and the second storage structure are different.

16. The commerce platform of claim 6,
wherein the invoice manager is further configured to:
receive, from the customer manager, (i) a payment identifier and (ii) an invoice identifier of the single invoice, and
store a relationship between the payment identifier and the invoice identifier, and
wherein the customer manager is further configured to:
receive the payment identifier and the invoice identifier from the payment system in response to initiating the payment in full on the single invoice, and
send the payment identifier and the invoice identifier to the invoice manager.

17. The non-transitory computer readable medium of claim 10,
wherein the accounting data repository has a first storage structure,
wherein the payment data repository has a second storage structure, and
wherein the first storage structure and the second storage structure are different.

18. The non-transitory computer readable medium of claim 10, wherein the computer readable program code is further for:
receiving, by the invoice accounting system and from a customer system, (i) a payment identifier and (ii) an invoice identifier of the single invoice, wherein the customer system receives the payment identifier and the invoice identifier from the payment system in response to initiating the payment in full on the single invoice; and
storing, by the invoice accounting system, a relationship between the payment identifier and the invoice identifier.

* * * * *

UNITED STATES PATENT AND TRADEMARK OFFICE
CERTIFICATE OF CORRECTION

PATENT NO. : 10,528,993 B2
APPLICATION NO. : 15/372384
DATED : January 7, 2020
INVENTOR(S) : Brittney Hoang et al.

It is certified that error appears in the above-identified patent and that said Letters Patent is hereby corrected as shown below:

In the Claims

Claim 8, Column 20, Line 34, the line reads "…determine that that the payment in full on the single…" but should read -- …determine that the payment in full on the single… --.

Signed and Sealed this
Nineteenth Day of May, 2020

Andrei Iancu
*Director of the United States Patent and Trademark Office*